(12) United States Patent
Chen

(10) Patent No.: US 11,958,390 B2
(45) Date of Patent: Apr. 16, 2024

(54) MAGNETIC SEAT ADJUSTMENT SYSTEM, VEHICLE, AND SEAT ADJUSTMENT METHOD

(71) Applicant: Foxtron Vehicle Technologies Co., Ltd., New Taipei (TW)

(72) Inventor: Ting-Wei Chen, New Taipei (TW)

(73) Assignee: Foxtron Vehicle Technologies Co., Ltd., New Taipei (TW)

( * ) Notice: Subject to any disclaimer, the term of this patent is extended or adjusted under 35 U.S.C. 154(b) by 405 days.

(21) Appl. No.: 17/241,431

(22) Filed: Apr. 27, 2021

(65) Prior Publication Data

US 2022/0203873 A1 Jun. 30, 2022

(30) Foreign Application Priority Data

Dec. 31, 2020 (CN) .......................... 202011620790.5

(51) Int. Cl.
*B60N 2/50* (2006.01)
*H01F 7/02* (2006.01)
*B60N 2/02* (2006.01)

(52) U.S. Cl.
CPC ............ *B60N 2/501* (2013.01); *B60N 2/505* (2013.01); *H01F 7/0236* (2013.01); *B60N 2/0244* (2013.01)

(58) Field of Classification Search
CPC ...... B60N 2/501; B60N 2/505; B60N 2/0244; H01F 7/0236
See application file for complete search history.

(56) References Cited

U.S. PATENT DOCUMENTS

| 2012/0007294 | A1* | 1/2012 | Fujita | ..................... | B60N 2/505 267/131 |
| 2013/0186473 | A1* | 7/2013 | Mankame | ............. | F16F 13/305 137/13 |
| 2019/0023161 | A1 | 1/2019 | Sullivan et al. | | |

FOREIGN PATENT DOCUMENTS

| CN | 109674219 A | 4/2019 |
| CN | 211154718 U | 8/2020 |
| CN | 211765081 U | 10/2020 |

* cited by examiner

*Primary Examiner* — Rafael O De Leon Domenech
(74) *Attorney, Agent, or Firm* — ScienBiziP, P.C.

(57) ABSTRACT

A magnetic seat adjustment system includes a frame structure, a movable adjustment mechanism, and a control system. The frame structure includes a first magnetic portion fixedly coupled to the frame structure and including first magnetic members that independently generate a magnetic field. The movable adjustment mechanism includes a movable base and a second magnetic portion. The second magnetic portion is fixedly coupled to the movable base and includes second magnetic members that independently generate a magnetic field. The control system controls a change in the magnetic field of the second magnetic members and/or the first magnetic members. When the magnetic field of the second magnetic members interacts with the magnetic field of the first magnetic members, the seat is in a magnetic levitation state, so that movement of the movable base drives movement of the seat.

11 Claims, 11 Drawing Sheets

MAGNETIC SEAT ADJUSTMENT SYSTEM, VEHICLE, AND SEAT ADJUSTMENT METHOD

FIELD

The subject matter herein generally relates to seat adjustment systems, and more particularly to a magnetic seat adjustment system, a vehicle having the magnetic seat adjustment system, and a seat adjustment method.

BACKGROUND

At present, a seat in a vehicle adopts a mechanical structure such as a sliding rail to adjust a position of the seat in the vehicle. However, this kind of mechanical structure limits a degree of freedom of adjustment of the seat, and the seat can only move according to a trajectory defined by the mechanical structure. Furthermore, the mechanical mechanisms occupies space and may obstruct a passenger space in the vehicle.

BRIEF DESCRIPTION OF THE DRAWINGS

Implementations of the present disclosure will now be described, by way of embodiments, with reference to the attached figures.

DETAILED DESCRIPTION

Figure 1:
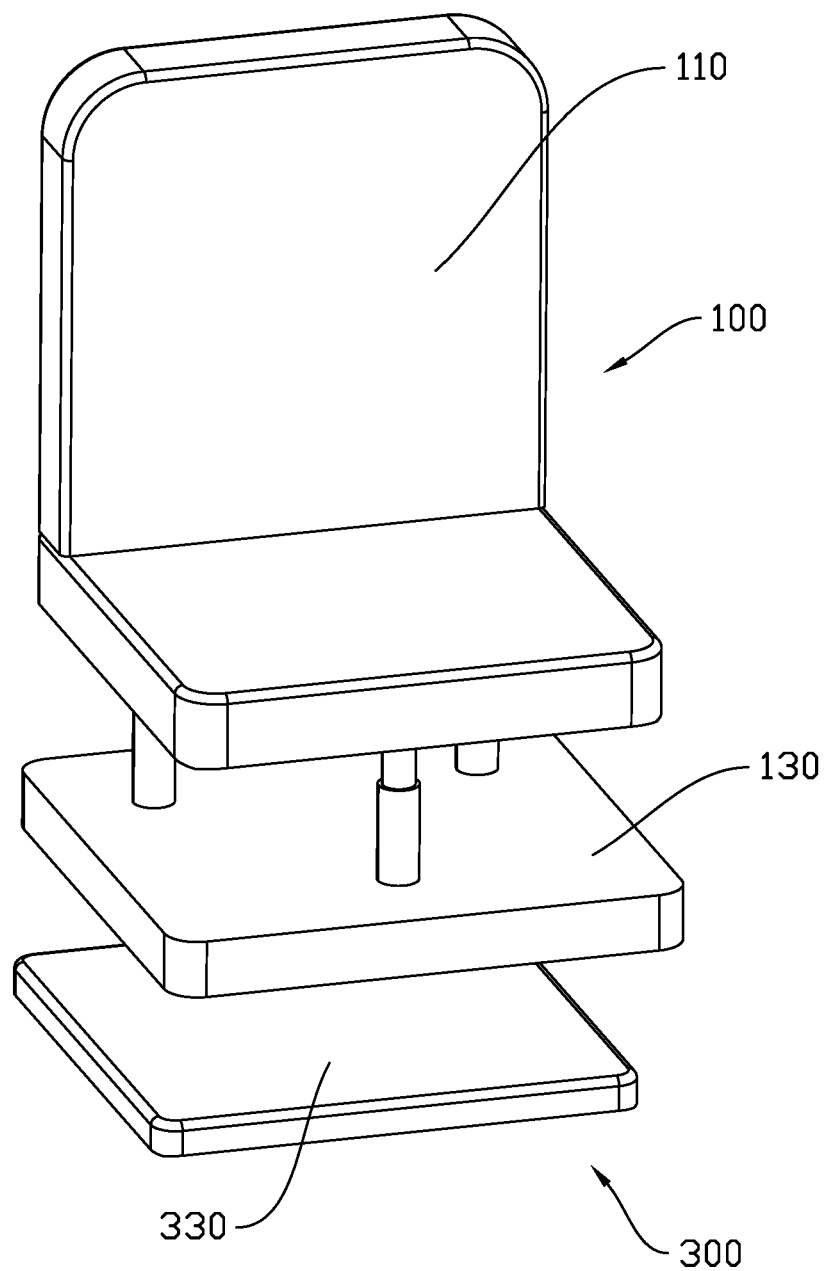
FIG. 1 is a schematic perspective diagram of a seat and a movable adjustment mechanism of a magnetic seat adjustment system according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 5:
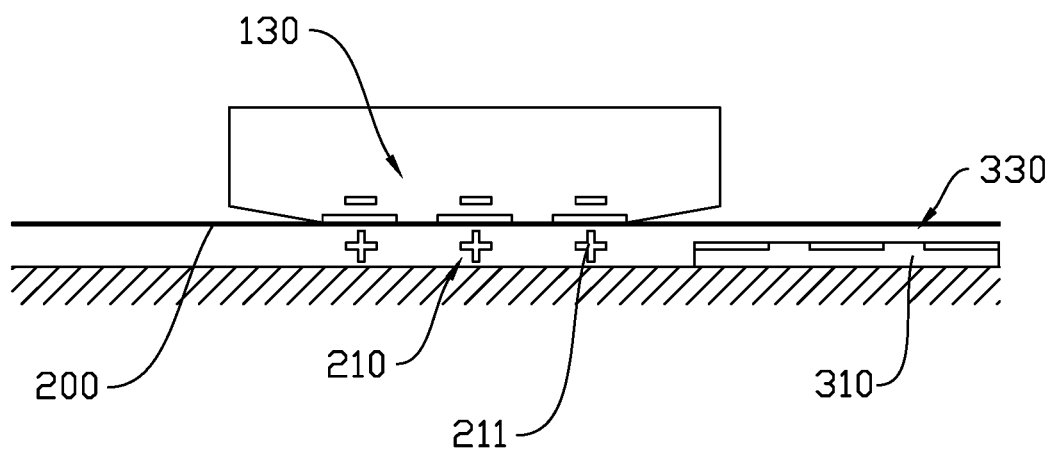
FIG. 5 is a schematic diagram showing the first magnetic portion not matched with the second magnetic portion and the seat not in the magnetic levitation state.
Figure 8:
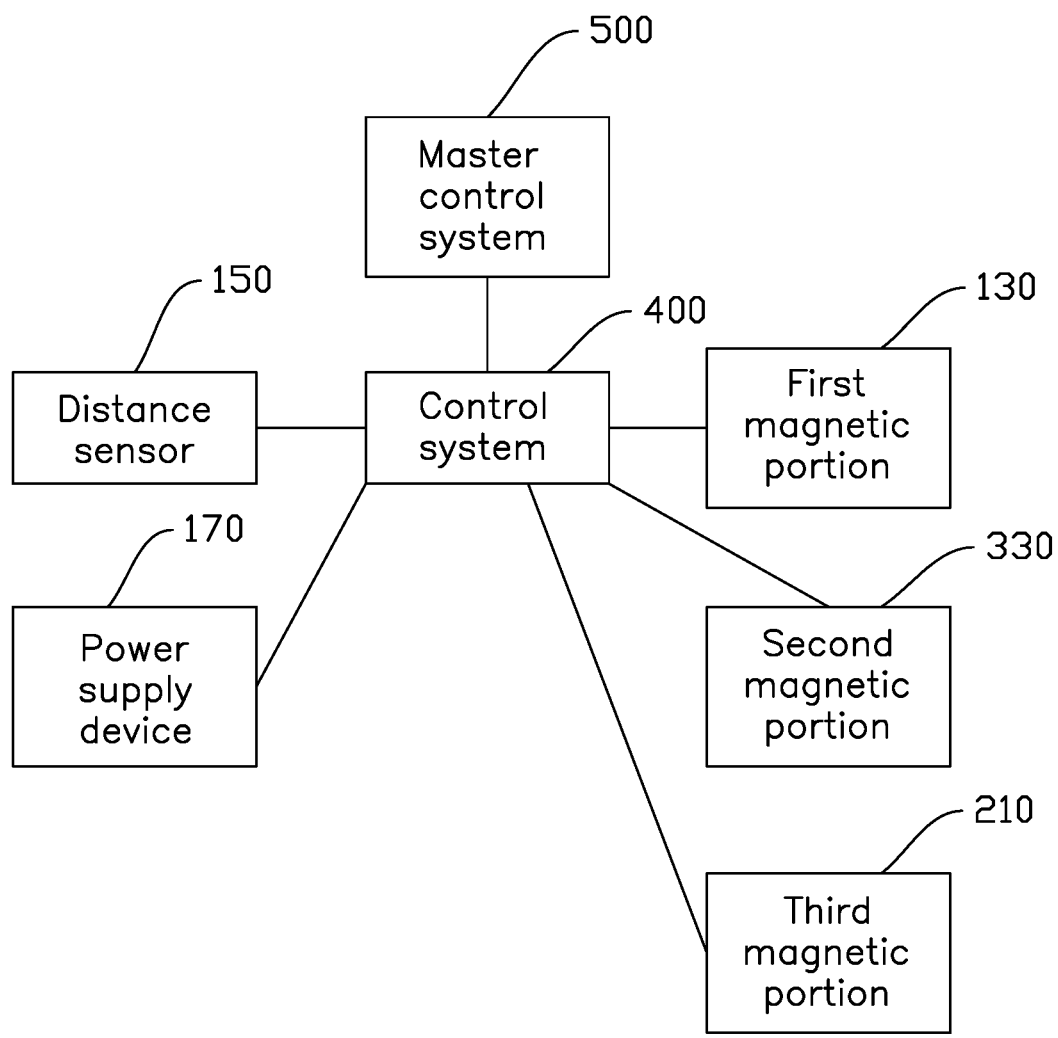
FIG. 8 is a schematic block diagram of the magnetic seat adjustment system according to an embodiment of the present disclosure.

Referring to FIG. 1, FIG. 5, and FIG. 8, a first embodiment of a magnetic seat adjustment system includes a seat 100, a movable adjustment mechanism 300, and a control system 400.

Figure 2:
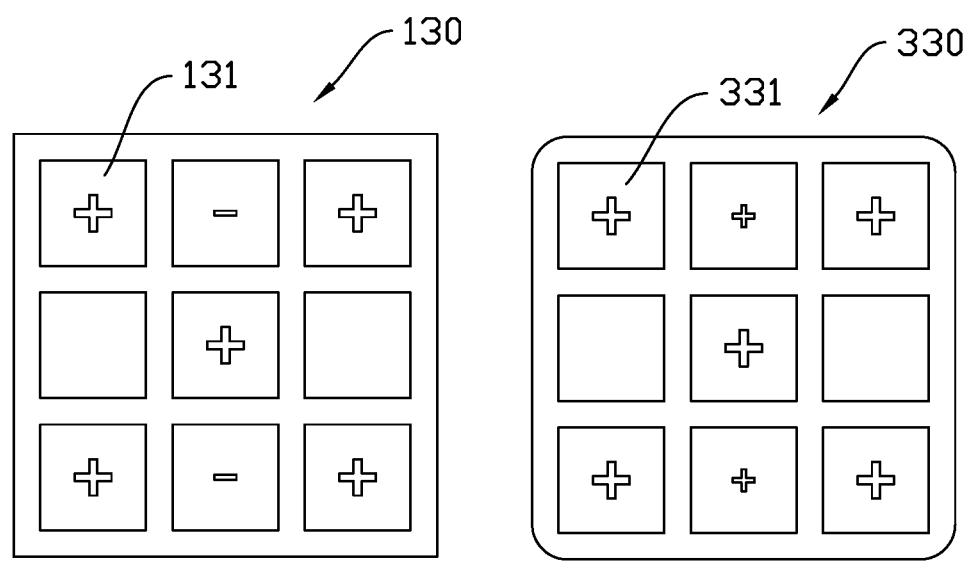
FIG. 2 is a schematic diagram of a structure of a first magnetic portion and a second magnetic portion when the seat in FIG. 1 is in a magnetic levitation state.

Referring to FIGS. 1 and 2, the seat 100 includes a frame structure 110 and a first magnetic portion 130. The first magnetic portion 130 is fixedly coupled to the frame structure 110. The first magnetic portion 130 includes a plurality of first magnetic members 131, and each of the plurality of first magnetic members 131 independently generates a magnetic field. The movable adjustment mechanism 300 includes a movable base 310 and a second magnetic portion 330. The second magnetic portion 330 is fixedly coupled to the movable base 310, and the second magnetic portion 330 includes a plurality of second magnetic members 331. Each of the plurality of second magnetic members 331 independently generates a magnetic field. The control system 400 is used to control the second magnetic members 331 and/or the first magnetic members 131. When the magnetic fields of the second magnetic members 331 interact with the magnetic fields of the first magnetic members 131, the seat 100 is driven to move by the movable base 310.

When both the first magnetic portion 130 and the second magnetic portion 330 are electromagnets, a control effect and flexibility between the seat 100 and the movable adjustment mechanism 300 are greater. When one of the first magnetic portion 130 and the second magnetic portion 330 is a permanent magnet and the other one of the first magnetic portion 130 and the second magnetic portion 330 is an electromagnet, the control system 400 only needs to control the electromagnet to control interaction between the first magnetic portion 130 and the second magnetic portion 330, but a control effect is not as great as when both the first magnetic portion 130 and the second magnetic portion 330 are electromagnets. When the first magnetic portion 130 and the second magnetic portions 330 are both electromagnets, the control system 400 can individually control portions of the first magnetic members 131 of the first magnetic portion 130 and portions of the first magnetic members 331 of the second magnetic portion 330, so as to control a magnetic attraction and repulsion force distribution between the seat 100 and the movable adjustment mechanism 300 to finely and smoothly adjust a position of the seat 100.

In one embodiment, the first magnetic portion 130 is an electromagnet. In order to provide continuous and large power to the first magnetic portion 130, the seat 100 is provided with a power supply device 170. The power supply device 170 is kept powered on, so the power supply device 170 includes a wireless charging module. The power supply device 170 can be charged by the wireless charging module, so that movement of the seat 100 will not be affected by cables. In order to ensure safety of wireless charging, the wireless charging module is turned off when the seat 100 is in a magnetic levitation state. When the seat 100 is released from the magnetic levitation state, the wireless charging module is turned on to charge of the power supply device 170.

Referring to FIG. 2, the first magnetic portion 130 includes nine first magnetic members 131 arranged in a nine-square grid, and the second magnetic portion 330 includes nine second magnetic members 331 arranged in a nine-square grid. When the first magnetic members 131 arranged at four corners and a center of the first magnetic portion 130 and the second magnetic members 331 arranged at four corners and a center of the second magnetic portion 330 have same magnetic poles, a sufficient repulsive force is generated to magnetically levitate the seat 100. In addition, the first magnetic member 131 arranged at sides of the first magnetic portion 130 and the second magnetic members 331 arranged at sides of the second magnetic portion 330 have opposite magnetic poles, thereby generating an attractive force so that when the movable adjustment mechanism 300 moves, the seat 100 is driven to move together with the movable adjustment mechanism 300.

Figure 3:
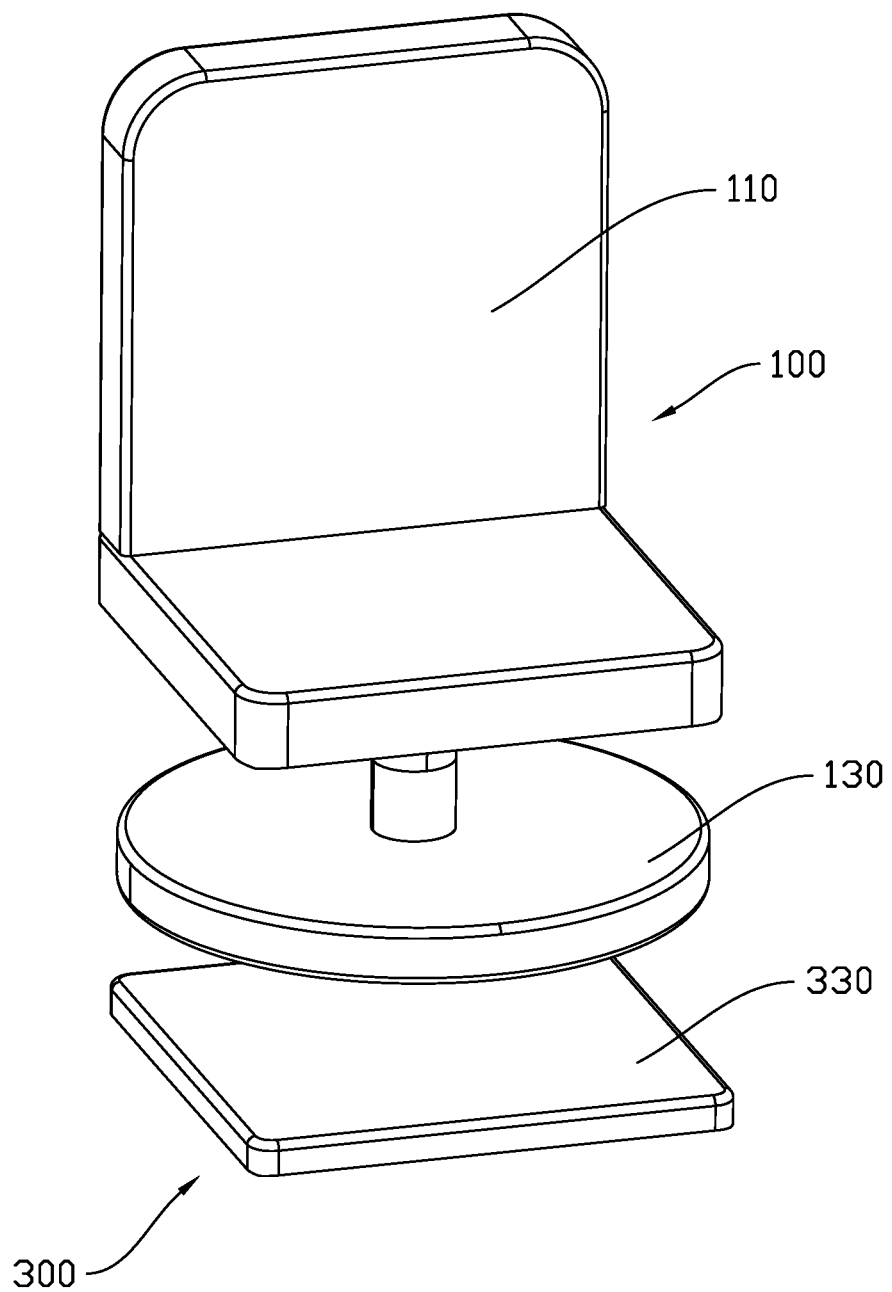
FIG. 3 is a schematic perspective diagram of the seat and the movable adjustment mechanism of the magnetic seat adjustment system according to another embodiment of the present disclosure.
Figure 4:
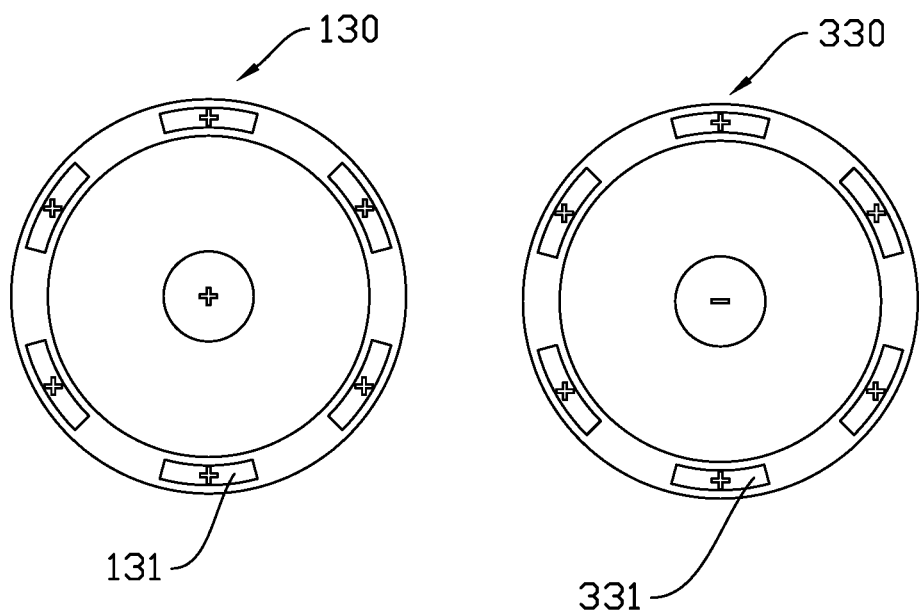
FIG. 4 is a schematic diagram of a structure of a first magnetic portion and a second magnetic portion when the seat in FIG. 3 is in a magnetic levitation state.

In other embodiments, the first magnetic portion 130 and the second magnetic portion 330 may adopt other shapes, and the first magnetic members 131 and the second magnetic members 331 may be arranged in other forms. For example, referring to FIGS. 3 and 4, the first magnetic portion 130 and the second magnetic portion 330 are circular. One first magnetic member 131 is arranged at a center of the first magnetic portion 130, and the other first magnetic members 131 are arranged around a circumference of the first magnetic portion 130. The second magnetic members 331 may be arranged in a similar configuration as the first magnetic members 131 as long as the arrangement of the first magnetic members 131 and the second magnetic members 331 enables the first magnetic portion 130 and the second magnetic portion 330 to maintain magnetic levitation of the seat 100 and enable the movable adjustment mechanism 300 to drive the seat 100 to move.

In other embodiments, the movable base 310 of the movable adjustment mechanism 300 may include additional driving components, such as rollers and tracks. The movable base 310 may also be driven by an external device in the related art, which will not be described in detail here.

A partition 200 is provided between the movable adjustment mechanism 300 and the seat 100. The partition 200 isolates a space where the movable adjustment mechanism 300 is located from a space where the seat 100 is located. The space where the seat 100 is located is a passenger space. Through the isolation of the partition 200, the movement of the movable adjustment mechanism 300 will not affect the movement of passengers or the placement of items in the space where the seat 100 is located. In one embodiment, the movable adjustment mechanism 300 is arranged under the seat 100, and the partition 200 is a bottom plate below the seat 100. A top of the bottom plate is for carrying the seat 100. When the first magnetic portion 130 and the second magnetic portion 330 do not interact, the seat 100 is supported on the partition 200.

Figure 6:
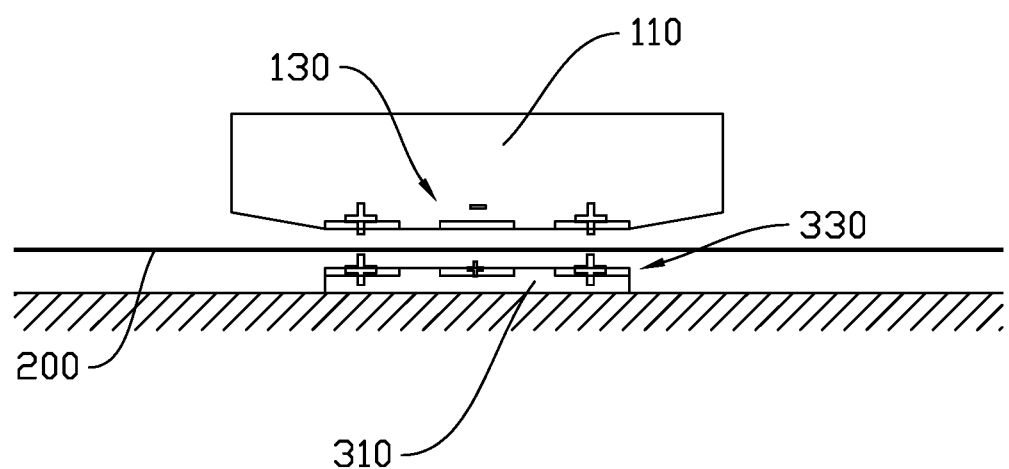
FIG. 6 is a schematic diagram showing the first magnetic portion matched with the second magnetic portion and the seat in the magnetic levitation state.

Referring to FIGS. 5 and 6, the partition 200 is further provided with a third magnetic portion 210. The third magnetic portion 210 includes at least one third magnetic member 211. A magnetic field of the at least one third magnetic member 211 can interact with the magnetic field of the first magnetic members 131 to make the seat 100 and the partition 200 relatively fixed. Through continuous attraction between the third magnetic portion 210 and the first magnetic portion 130, the seat 100 can be fixed to a corresponding position on the partition 200.

In other embodiments, the third magnetic portion 210 may be omitted, so that the position of the seat 100 is maintained by maintaining the position of the movable adjustment mechanism 300. In other embodiments, the position of the seat 100 is maintained by friction and inertia of the seat 100 on the partition 200.

Figure 7:
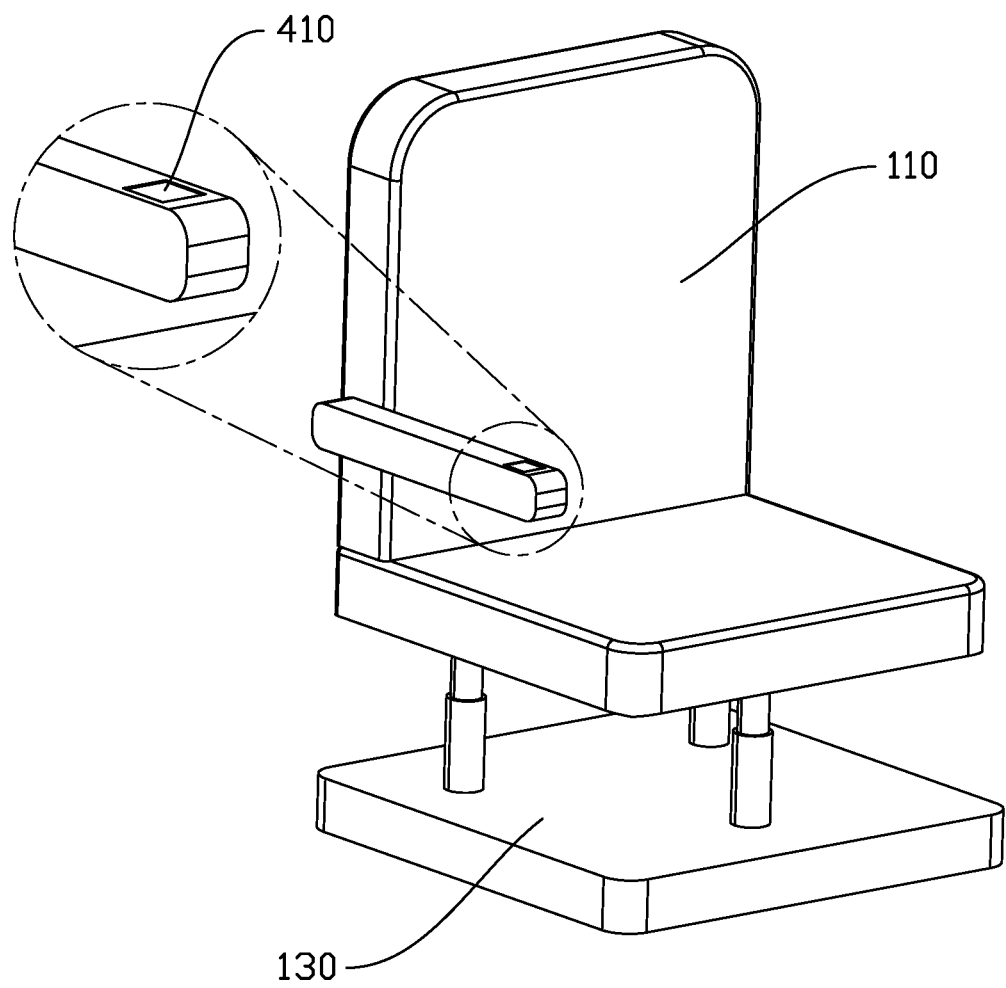
FIG. 7 is a schematic perspective diagram of the seat.

Referring to FIGS. 7 and 8, since the seat 100 needs to be in the magnetic levitation state to avoid friction between the seat 100 and the partition 200, a distance sensor 150 is provided to sense whether the seat 100 is in the magnetic levitation state and a distance between the seat 100 in the magnetic levitation state and the partition 200. If the distance between the seat 100 and the partition 200 is too close, a slight tilt during the movement of the seat 100 will cause scratches between the seat 100 and the partition 200. Data collected by the distance sensor 150 is processed for reference by the control system 400 or for reference through a display device. Therefore, the distance sensor 150 is electrically coupled to the control system 400 to integrate the data collected by the distance sensor 150. The data is transmitted to the control system 400, and the control system 400 includes a control panel 410 on the seat 100 to facilitate the adjustment of the seat 100 by passengers.

Referring to FIGS. 1-4, the first magnetic members 131 of the first magnetic portion 130 and the second magnetic members 331 of the second magnetic portion 330 are arranged in a plane to improve a flatness of a bottom of the seat 100, which is convenient for fixing the position of the seat 100. To ensure that the seat 100 does not tip over during movement, the seat 100 may be provided with a balance sensor (not shown) to sense a balance state of the seat 100 during movement. The balance sensor may be a gyroscope. The balance sensor is electrically coupled to the control system 400. When the seat 100 is tilted, the processor 400 can adjust the local magnetic field of the first magnetic portion 130 and/or the second magnetic portion 330 according to the balance state sensed by the balance sensor to correct the balance state of the seat 100.

Figure 9:
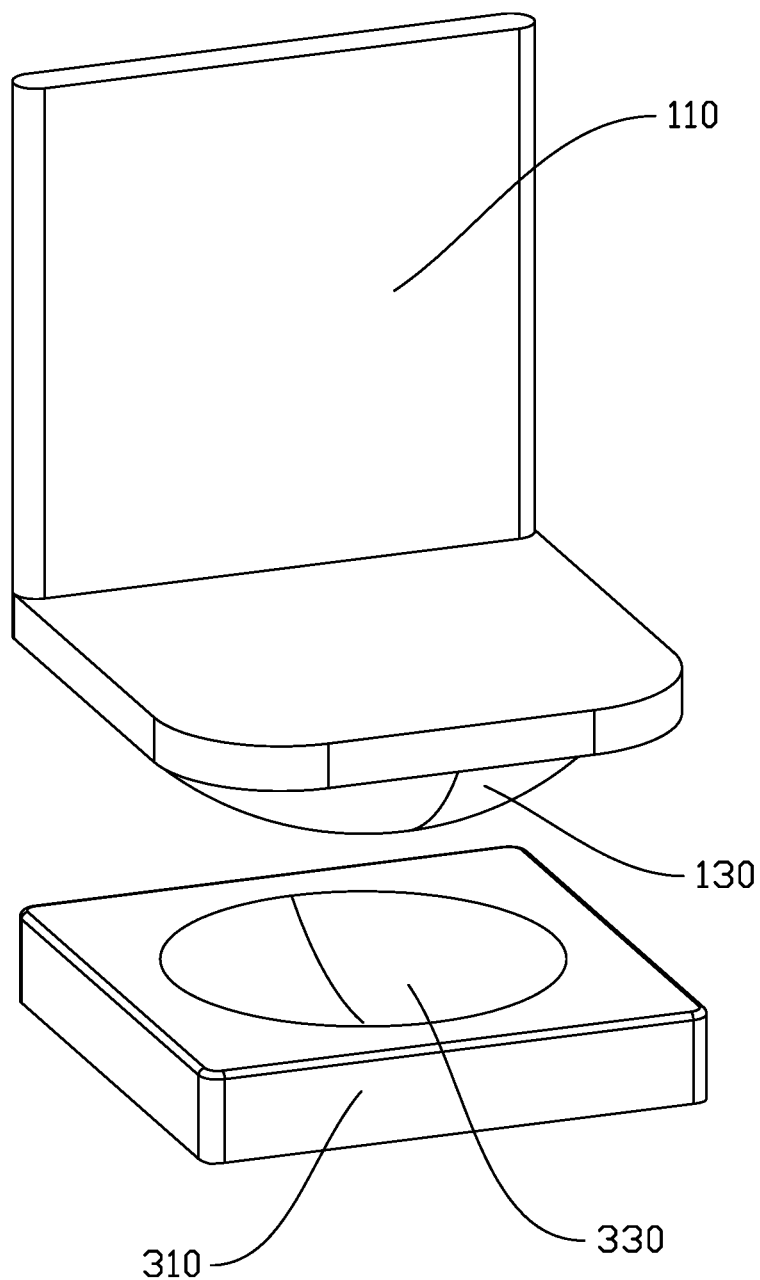
FIG. 9 is a schematic perspective diagram of the seat and the movable adjustment mechanism of the magnetic seat adjustment system according to another embodiment of the present disclosure.

FIG. 9 shows another embodiment of the first magnetic portion 130 and the second magnetic portion 330 for reducing tilt of the seat 100. The first magnetic portion 130 may be arranged in a convex hemispherical shape, and the second magnetic portion 330 may be arranged in a concave hemispherical shape. The second magnetic portion 330 generates a magnetic field toward a center of the hemispherical shape to lift the seat 100. The balance sensor may also be provided to adjust the balance state of the seat 100 during movement.

The frame structure 110 may further be provided with a seat cushion and a seat back to improve comfort for passengers.

Figure 11:
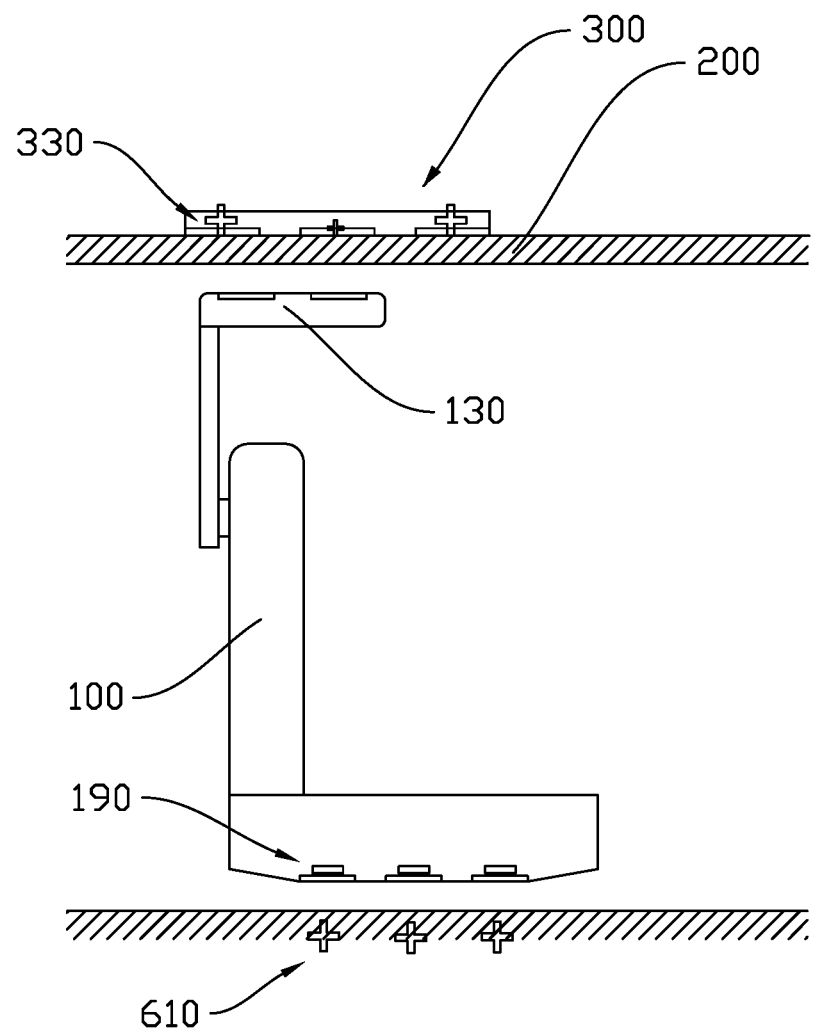
FIG. 11 is a schematic diagram of the seat and the movable adjustment mechanism of the magnetic seat adjustment system according to another embodiment of the present disclosure.

Referring to FIG. 11, in another embodiment, the movable adjustment mechanism 300 may be arranged above the seat 100, and the partition 200 is arranged between the seat 100 and the movable adjustment mechanism 300. The partition 200 carries the movable adjustment mechanism 300. The first magnetic portion 130 of the seat 100 is fixedly arranged at a top end of the seat 100 adjacent to the partition 200. In addition, a fourth magnetic portion 190 is provided on a bottom of the seat 100, and a fifth magnetic portion 610 is provided on a bottom plate below the bottom of the seat 100. When the position of the seat 100 needs to be fixed, a magnetic field of the fourth magnetic portion 190 and a magnetic field of the fifth magnetic portion 610 cooperate to fix the position of the seat 100 on the bottom plate.

The magnetic seat adjustment system provided by the present disclosure can realize the adjustment of the position of the seat 100 when the seat 100 is in the magnetic levitation state. There are no connecting devices such as sliding rails between the seat 100 and the bottom plate, so that a degree of freedom of seat adjustment is high and not restricted by the connecting device. Thus, the seat 100 is adjusted smoothly, and comfort during adjustment is improved. No additional connection structures are provided in the passenger space, so that the passenger space is unobstructed.

FIG. 5 and FIG. 6 show an embodiment of a vehicle. The vehicle includes a vehicle body and the magnetic seat adjustment system described above.

The vehicle body includes a master control system 500, and the position of the seat 100 in the magnetic seat adjustment system can be adjusted through the master control system 500 of the vehicle.

An operator of the vehicle can observe various parameters in the magnetic seat adjustment system, so as to observe the position adjustment process of the seat 100 and facilitate safety inspection of the magnetic seat adjustment system.

Displacement of the movable adjustment mechanism 300 in the vehicle body can be achieved in various ways. In one embodiment, the movable base 310 is provided with rollers, and the movable base 310 drives the rollers to move on a bearing surface of the vehicle body. In other embodiments, the movable adjustment mechanism 300 may be displaced by an auxiliary driving member provided in the vehicle body. For example, the auxiliary driving member includes X sliding rails and Y sliding rails, and the movable base 310 is slidably arranged on the Y sliding rails. The Y sliding rails are slidingly matched with the X sliding rails. The auxiliary driving member may also be a linking rod mechanism having a free end and a driving end. A driving member is provided on the vehicle body, an output end of the driving member is matched with the driving end, and the movable base 310 is coupled to the free end. The driving member drives the free end of the linking rod mechanism to move, thereby driving the movable base 310 to move.

In addition, the displacement of the movable adjustment mechanism 300 in the vehicle body may include a translational displacement and/or a rotational displacement. Translational displacement refers to a linear change in position of the movable adjustment mechanism 300 along a length of the vehicle body, and rotational displacement refers to a rotational change in position of the movable adjustment mechanism 300 without translational displacement.

The vehicle provided by the present disclosure can provide movement space for the movable adjustment mechanism 300. When the movable adjustment mechanism 300 does not have the ability to move autonomously, an auxiliary driving member can also be provided to drive the movable adjustment mechanism 300 to move. The master control system 500 on the vehicle can control the magnetic seat adjustment system, so that the operator of the vehicle can observe various parameters in the magnetic seat adjustment system, so as to observe the position adjustment process of the seat 100 and facilitate inspection of the magnetic seat adjustment system.

Figure 10A:
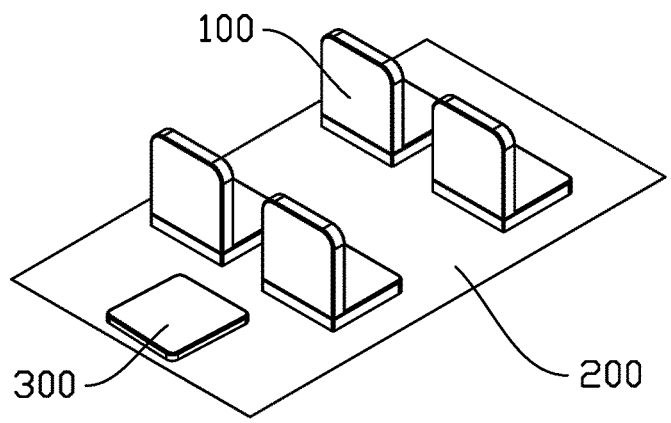
FIG. 10A is a schematic diagram showing the first magnetic portion not matched with the second magnetic portion.
Figure 10B:
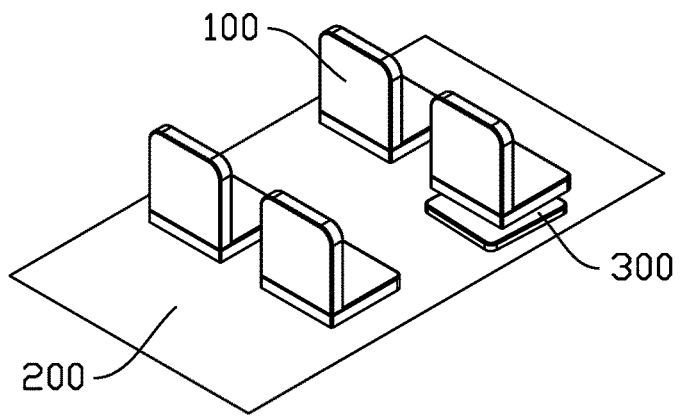
FIG. 10B is a schematic diagram showing the first magnetic portion matched with the second magnetic portion.
Figure 10C:
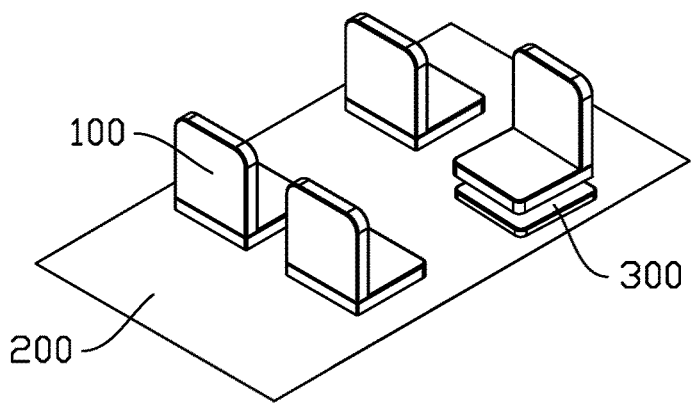
FIG. 10C is a schematic diagram showing the seat moved to a different position by the movable adjustment mechanism.

FIGS. 10A, 10B, and 10C show an embodiment of a seat adjustment method. The seat adjustment method is used to adjust the position of the seat 100 in the magnetic seat adjustment system and includes the following steps:

Moving the movable adjustment mechanism 300 until the second magnetic portion 330 corresponds to the first magnetic portion 130;

Activating a portion of the first magnetic members 131 in the first magnetic portion 130 to form a first levitation magnetic field and activating a portion of the second magnetic members 331 in the second magnetic portion 330 to form a second levitation magnetic field, the first levitation magnetic field repelling the second levitation magnetic field to cause the seat 100 to magnetically levitate;

Activating a portion of the first magnetic members 131 in the first magnetic portion 130 to form a first traction magnetic field and activating a portion of the second magnetic members 331 in the second magnetic portion 330 to form a second traction magnetic field, the first traction magnetic field attracting the second traction magnetic field so that the movable adjustment mechanism 300 tracks the seat 100;

Driving the movable adjustment mechanism 300 to move, so that the movable adjustment mechanism 300 drives the seat 100 to move; and Deactivating the second magnetic portion 330 and/or the first magnetic portion 130.

If the first magnetic portion 130 is deactivated in the previous step, at least a portion of the first magnetic members 131 in the first magnetic portion 130 can be activated again, and then at least one third magnetic member 211 of the third magnetic portion 210 can be activated, so that the first magnetic portion 130 and the third magnetic portion 210 attract each other. If the first magnetic portion 130 is not deactivated in the previous step, at least one third magnetic member 211 of the third magnetic portion 210 can be activated so that the first magnetic portion 130 and the third magnetic portion 210 attract each other.

In summary, when the first magnetic portion 130 and the second magnetic portion 330 are not activated, the movable adjustment mechanism 300 is moved to the corresponding position of the seat 100 so that the position of the first magnetic portion 130 corresponds to the position of the second magnetic portion 330. When the first magnetic portion 130 and the second magnetic portion 330 are both electromagnets, both the first magnetic portion 130 and the second magnetic portion 330 are activated. At this time, a portion of the first magnetic members 131 and a portion of the second magnetic members 331 repel each other, thereby causing the seat 100 to be in the magnetic levitation state. The other portion of the first magnetic members 131 and the other portion of the second magnetic members 331 attract each other, so that when the movable adjustment mechanism 300 is moved, the seat 100 is driven to move. The position of the seat 100 relative to the partition 200 is fixed by the attraction between the third magnetic portion 210 and the first magnetic portion 130.

The magnetic symbols (+, −) in the figures are only used as examples for illustration, and those skilled in the art can change the magnetic arrangement and combinations for different purposes.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A magnetic seat adjustment system comprising:
   a frame structure comprising a first magnetic portion, the first magnetic portion fixedly coupled to the frame structure, and the first magnetic portion comprising a plurality of first magnetic members that independently generate a magnetic field;
   a movable adjustment mechanism comprising a movable base and a second magnetic portion, the second magnetic portion fixedly coupled to the movable base and comprising a plurality of second magnetic members that independently generate a magnetic field; and
   a control system used to control a change in the magnetic field of the plurality of second magnetic members and/or the plurality of first magnetic members;
   wherein:
   when the magnetic field of the plurality of second magnetic members interacts with the magnetic field of the plurality of first magnetic members, the seat is in a magnetic levitation state, so that movement of the movable base drives movement of the seat.

2. The magnetic seat adjustment system of claim 1, further comprising a partition, wherein:
   the partition is arranged between the seat and the movable adjustment mechanism;
   the partition is provided with a third magnetic portion comprising at least one third magnetic member; and
   a magnetic field of the at least one third magnetic member interacts with the magnetic field of at least one of the plurality of first magnetic members to fix a position between the seat and the partition.

3. The magnetic seat adjustment system of claim 2, wherein:
   the seat further comprises a distance sensor for sensing a distance between the seat and the partition; and
   the distance sensor is electrically coupled to the control system.

4. The magnetic seat adjustment system of claim 1, wherein:
   the seat further comprises a power supply device electrically coupled to the first magnetic portion.

5. The magnetic seat adjustment system of claim 1, wherein:
   at least one of the first magnetic portion and the second magnetic portion is an electromagnet.

6. A vehicle comprising:
   a master control system; and
   a magnetic seat adjustment system electrically coupled to the master control system, the magnetic seat adjustment system comprising:
   a frame structure comprising a first magnetic portion, the first magnetic portion fixedly coupled to the frame structure, and the first magnetic portion comprising a plurality of first magnetic members that independently generate a magnetic field;
   a movable adjustment mechanism comprising a movable base and a second magnetic portion, the second magnetic portion fixedly coupled to the movable base and comprising a plurality of second magnetic members that independently generate a magnetic field; and
   a control system used to control a change in the magnetic field of the plurality of second magnetic members and/or the plurality of first magnetic members;
   wherein:
   when the magnetic field of the plurality of second magnetic members interacts with the magnetic field of the plurality of first magnetic members, the seat is in a magnetic levitation state, so that movement of the movable base drives movement of the seat.

7. The vehicle of claim 6, wherein:
   the magnetic seat adjustment system further comprises a partition;
   the partition is arranged between the seat and the movable adjustment mechanism;
   the partition is provided with a third magnetic portion comprising at least one third magnetic member; and
   a magnetic field of the at least one third magnetic member interacts with the magnetic field of at least one of the plurality of first magnetic members to fix a position between the seat and the partition.

8. The vehicle of claim 7, wherein:
   the seat further comprises a distance sensor for sensing a distance between the seat and the partition; and
   the distance sensor is electrically coupled to the control system.

9. The vehicle of claim 6, wherein:
   the seat further comprises a power supply device electrically coupled to the first magnetic portion.

10. The vehicle of claim 6, wherein:
    at least one of the first magnetic portion and the second magnetic portion is an electromagnet.

11. A seat adjustment method comprising:
    moving a movable adjustment mechanism until a second magnetic portion of the movable adjustment mechanism corresponds to a first magnetic portion of a seat;
    activating a first portion of a plurality of first magnetic members in the first magnetic portion to form a first levitation magnetic field and activating a first portion of a plurality of second magnetic members in the second magnetic portion to form a second levitation magnetic field, the first levitation magnetic field repelling the second levitation magnetic field to cause the seat to magnetically levitate;
    activating a second portion of the plurality of first magnetic members in the first magnetic portion to form a first traction magnetic field and activating a second portion of the plurality of second magnetic members in the second magnetic portion to form a second traction magnetic field, the first traction magnetic field attracting the second traction magnetic field so that the movable adjustment mechanism tracks the seat;
    driving the movable adjustment mechanism to move, so that the movable adjustment mechanism drives the seat to move; and
    deactivating the second magnetic portion and/or the first magnetic portion.

* * * * *